(12) United States Patent
Calverley et al.

(10) Patent No.: US 9,425,655 B2
(45) Date of Patent: Aug. 23, 2016

(54) MAGNETIC POLE-PIECE SUPPORT

(75) Inventors: Stuart David Calverley, Sheffield (GB); David James Powell, Sheffield (GB)

(73) Assignee: MAGNOMATICS LIMITED, Sheffield (GB)

( * ) Notice: Subject to any disclaimer, the term of this patent is extended or adjusted under 35 U.S.C. 154(b) by 692 days.

(21) Appl. No.: 12/992,150

(22) PCT Filed: May 12, 2009

(86) PCT No.: PCT/GB2009/001178
§ 371 (c)(1),
(2), (4) Date: Feb. 7, 2011

(87) PCT Pub. No.: WO2009/138728
PCT Pub. Date: Nov. 19, 2009

(65) Prior Publication Data
US 2011/0121672 A1    May 26, 2011

(30) Foreign Application Priority Data

May 12, 2008   (GB) .................................. 0808524.3
Feb. 13, 2009   (GB) .................................. 0902370.6

(51) Int. Cl.
| | | |
|---|---|---|
| H02K 49/10 | (2006.01) |
| H02K 1/18 | (2006.01) |
| H02K 1/08 | (2006.01) |
| H02K 51/00 | (2006.01) |
| H02K 1/02 | (2006.01) |

(52) U.S. Cl.
CPC ............... *H02K 1/08* (2013.01); *H02K 49/102* (2013.01); *H02K 51/00* (2013.01); *H02K 1/02* (2013.01)

(58) Field of Classification Search
CPC ........ H02K 51/00; H02K 1/08; H02K 49/102; H02K 1/02
USPC ............ 310/216.074, 216.113, 103, 216.058, 310/216.118, 216.129
See application file for complete search history.

(56) References Cited

U.S. PATENT DOCUMENTS

| | | | | |
|---|---|---|---|---|
| 633,857 | A * | 9/1899 | Lamme ................. | H02K 3/522 310/194 |
| 1,353,658 | A * | 9/1920 | Kostko .................. | 310/216.088 |
| 1,756,672 | A * | 4/1930 | Barr ...................... | 310/216.078 |
| 2,058,362 | A * | 10/1936 | Smalley ................ | H02K 1/185 29/609 |
| 3,124,733 | A * | 3/1964 | Andrews ............... | H02K 29/00 310/156.46 |
| 3,130,337 | A * | 4/1964 | Stoller ................... | 310/216.079 |

(Continued)

FOREIGN PATENT DOCUMENTS

| | | |
|---|---|---|
| DE | 20008322 | 8/2000 |
| DE | 10121709 A1 * | 11/2001 ............. H02K 51/00 |

(Continued)

OTHER PUBLICATIONS

Atallah et al., "A Novel High-Performance Magnetic Gear", IEEE Transactions on Magnetics, Jul. 2001, 37(4), 2844-2846.

(Continued)

*Primary Examiner* — Alex W Mok
(74) *Attorney, Agent, or Firm* — Dorsey & Whitney LLP

(57) ABSTRACT

A pole piece support comprising a frame having a spaced array of non-magnetic support structures, wherein disposed between at least a pair of adjacent non-magnetic support structures is a magnetic pole piece supported along at least a portion of its body by the adjacent non-magnetic support structures.

23 Claims, 6 Drawing Sheets

(56) References Cited

U.S. PATENT DOCUMENTS

| | | | |
|---|---|---|---|
| 4,284,920 A * | 8/1981 | Nelson | 310/432 |
| 4,469,973 A * | 9/1984 | Guyot et al. | 310/433 |
| 4,680,224 A * | 7/1987 | O'Connor | 428/298.1 |
| 5,398,397 A * | 3/1995 | Johnson | 29/596 |
| 5,877,578 A * | 3/1999 | Mitcham et al. | 310/268 |
| 5,923,105 A * | 7/1999 | Albrecht et al. | 310/67 R |
| 6,091,172 A * | 7/2000 | Kakinuma et al. | 310/71 |
| 6,150,747 A * | 11/2000 | Smith et al. | 310/216.137 |
| 6,489,701 B1 * | 12/2002 | Gamble et al. | 310/179 |
| 6,566,785 B1 * | 5/2003 | Tong | 310/270 |
| 6,657,357 B2 * | 12/2003 | Boardman | H02K 5/20 310/216.114 |
| 2004/0108781 A1 | 6/2004 | Razzell et al. | |
| 2004/0160585 A1 * | 8/2004 | Jacobs et al. | 355/53 |
| 2005/0057112 A1 * | 3/2005 | Lopatinsky | F04D 25/066 310/208 |
| 2005/0077802 A1 | 4/2005 | Toujima et al. | |
| 2006/0192453 A1 * | 8/2006 | Gieras | H02K 7/1025 310/92 |
| 2006/0273683 A1 * | 12/2006 | Caprio et al. | 310/211 |
| 2007/0024151 A1 * | 2/2007 | Du et al. | 310/254 |
| 2008/0238232 A1 * | 10/2008 | Bando et al. | 310/126 |

FOREIGN PATENT DOCUMENTS

| | | | |
|---|---|---|---|
| DE | 10047045 A1 * | 5/2002 | |
| EP | 1353436 | 10/2003 | |
| EP | 1528659 | 5/2005 | |
| GB | 2437568 A * | 10/2007 | |
| GB | 2439111 A * | 12/2007 | |
| JP | 2003299327 | 10/2003 | |
| WO | WO 2007/125284 | 11/2007 | |

OTHER PUBLICATIONS

K. Atallah, S.D. Calverley and D. Howe; Design, analysis and realisation of a high-performance magnetic gear; IEE Proceedings: Electric Power Applications, Institution of Electrical Engineers, vol. 151, No. 2, Mar. 9, 2004.

* cited by examiner

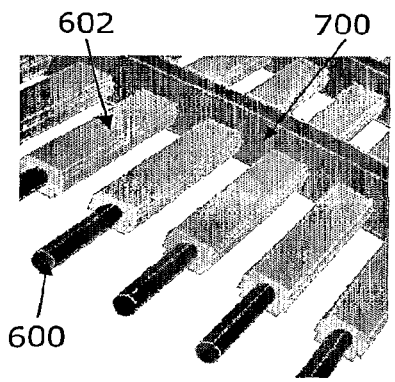
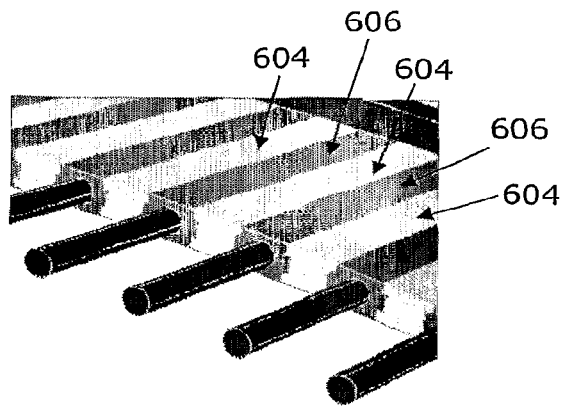
FIGURE 6a    FIGURE 6b
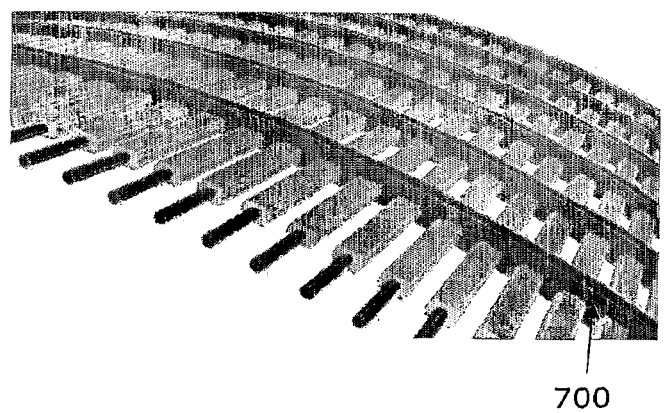
FIGURE 7

MAGNETIC POLE-PIECE SUPPORT

CROSS REFERENCE TO RELATED APPLICATIONS

This application claims the benefit of International Application No. PCT/GB2009/001178 filed May 12, 2009, having a claim of priority to GB patent application number 08 08524.3, filed May 12, 2008, and GB patent application number 09 02370.6, filed Feb. 13, 2009.

The present invention relates, in general, to novel designs of magnetic pole-piece support structures used for magnetic gears and machines with integrated magnetic gearing such as the so-called pseudo direct drive machines.

Magnetic gears offer significant advantages compared with mechanical gears, such as no contacting surfaces, removing the need for lubrication, and hence reduced maintenance and improved reliability, inherent overload protection (as the gear harmlessly pole slips on over torque), and physical isolation between the input and output shafts. Providing the iron losses (e.g. due to eddy currents in the pole pieces) can be minimised, the magnetic gear is also highly efficient.

A magnetic gear topology which combines a high torque transmission capability and high efficiency is disclosed in WO 2007/125284, the contents of which are incorporated herein in their entirety.

Referring to FIG. 1 of WO 2007/125284, a rotary magnetic gear 100 is provided by a first or inner rotor 102, a second or outer rotor 104 and a number of pole pieces 106. The first rotor 102 comprises a support 108 bearing a respective first number of permanent magnets 110. In the illustrated magnetic gear of FIG. 1, the first rotor 102 comprises 8 permanent magnets or 4 pole-pairs arranged to produce a spatially varying magnetic field. The second rotor 104 comprises a support 112 bearing a respective second number of permanent magnets 114. The second rotor 104 illustrated comprises 46 permanent magnets or 23 pole-pairs arranged to produce a spatially varying field. The first and second numbers of permanent magnets are different. Accordingly, in the absence of the pole-pieces there will be little or no useful magnetic coupling or interaction between the permanents magnets 112 and 114 and there will be no net torque such that rotation of one rotor will not cause continuous rotation of the other rotor.

The pole pieces 106 are used to allow the fields of the permanent magnets 110 and 114 to couple together and transmit torque. The pole pieces 106 modulate the magnetic fields of the permanent magnets 110 and 114 so they interact to the extent that rotation of one rotor will induce rotation of the other rotor in a geared manner, i.e. the speed will be increased or decreased and the torque will be decreased or increased.

Within a gear, two of the three elements are rotating and one is held static. The inner high speed rotor is usually rotating, connected to the high speed input/output shaft and one of either the pole pieces or outer magnets can be the other rotor, (connected to the low speed shaft), with the other held static. These two arrangements offer a different gear ratio (similar in operation to a planetary gear). However, in a pseudo direct machine, in which the gear has been integrated into an electrical machine, the pole pieces are generally the low speed rotating element, with one set of magnets held stationary on the stator.

One skilled in the art understands how to select and design the pole pieces 106, given the first 110 and second 114 permanent magnets, to achieve the necessary magnetic circuit or coupling such that gearing between the first 102 and second 104 rotors results as can be appreciated from, for example, K. Atallah, D. Howe, "A novel high-performance magnetic gear", IEEE Transactions on Magnetics, Vol. 37, No. 4, pp. 2844-2846, 2001 and K. Atallah, S. D. Calverley, D. Howe, "Design, analysis and realisation of a high performance magnetic gear", IEE Proceedings—Electric Power Applications, Vol. 151, pp. 135-143, 2004, which are incorporated herein by reference in their entirety.

In alternative embodiments, an electrical motor/generator combined with a magnetic gear can be provided. Additionally, the pole-pieces included in the arrangement can be fixed as a stator or rotatable as a rotor themselves. An example of such an arrangement is provided in FIG. 2, which shows the principle of operation of such an electrical machine 200.

The electrical machine 200 comprises a first or inner rotor 202 having a support 204 bearing a first plurality of permanent magnets 206. In the embodiment shown, permanent magnets having 10 poles are used. However, embodiments are not limited to using such a number of permanent magnets. Embodiments can be realised that use some other number of permanent magnets. The electrical machine 200 comprises a second rotor 208 in the form of a plurality of ferromagnetic pole pieces. The pole pieces 208 are arranged to magnetically couple the permanent magnets 206 of the first/inner rotor 202 to a plurality of permanent magnets 210 that are fixed to a periphery of the wound stator in the region of the pole shoes 212 of respective teeth 214 thereby forming a stator 216. In the embodiment shown, 60 permanent magnets are fixed to the periphery of the wound stator 212. The embodiment comprises 15 teeth 214 with the respective periphery of the wound stator 212. It will be appreciated that embodiments are not limited to such a number of permanent magnets and teeth. Embodiments comprising some other number of permanent magnets and teeth can be realised.

The pole pieces 208 form a rotatable array of pole pieces 208. That is, they form a rotor. The inner rotor 202 is rotatable. The teeth 214 and associated permanent magnets 210 are fixed. The coupling between the permanent magnets 206 and the permanent magnets 210 is realised using the rotatable pole pieces 208. Associated with the stator 216 is a plurality of 3-phase windings 1, 1', 2, 2'and 3, 3'. The 3-phase windings, and associated currents, are arranged to create magnetic fields that to couple with or form magnetic circuits with the first or fundamental harmonic of the permanent magnets 206 associated with the inner rotor 202. The pole pieces 208 are usually connected to an end plate to transmit the torque to a central shaft. Although in the present case a plurality of 3-phase windings are associated with the stator 216, in general any multi-phase winding can be used such as a 5-phase winding.

During operation the pole pieces are subject to large mechanical loads as:
1) The output/input mechanical torque (or reaction torque) of the gear or machine acts circumferentially on the pole pieces (that is, tangential to the direction of motion);
2) A radial magnetic pull due to the permanent magnet field which is cyclic in nature due to the different speeds of the magnet rotor and pole pieces;
3) Each pole piece can be subject to a torsional force or torque about its own axis as it tries to align itself with the complex magnetic field.

Although an annulus structure can have high strength this is not the case here due to the requirement for alternating non-magnetic and magnetic regions requiring a combination of different materials. This problem is exacerbated by the fact that magnetic and therefore typically ferromagnetic segments are usually a laminated structure (typically stacks of laminates of Silicon Iron 0.2 to 0.65 mm thick) in order to prevent/ reduce eddy currents which would be induced by changing magnetic fields which lead to losses and reduced efficiency. The lamination stacks preferably should not be welded together as this creates an electrical short circuit allowing induced currents to flow. Alternatively the pole pieces could be manufactured from soft magnetic composite (SMC) which is a hot pressed part with good magnetic properties but a low electrical resistivity, but is mechanically inferior to solid steels. Therefore these components (either laminated or SMC) do not have high integral strength.

The non-magnetic regions in-between the pole-pieces are preferably non-conducting, precluding non-magnetic steels and other metallic structures, again to prevent eddy currents and their associated losses. Therefore, the intermediate regions are preferably a non-conducting, non-magnetic material such as a plastic, carbon-fibre or cast epoxy.

Previous examples of gears and magnetically geared machines have used pole-pieces moulded or cast into an epoxy substrate. However, fully enclosing the pole-pieces with material radially above and below the pole-piece (to radially contain the pole piece against the high magnetic forces) can have some drawbacks depending upon their application. For example, the magnetic airgap is extended which can reduce the performance of the gear/machine; and the cooling of the pole-pieces required to remove the heat due to hysteresis loss and eddy currents is significantly reduced. Ideally the faces of the pole pieces should be exposed to ensure they are adjacent a flow of cooling air.

Approaches to pole-piece rotor manufacture of this nature were disclosed in one of the applicant's previous patent applications GB0800463.2, the contents of which are hereby incorporated by reference in their entirety.

It is also possible to attach the pole pieces to an end-cap to take the torque to the output/input shaft or case although such an arrangement becomes more problematic as the machine (axial) length increases. If the pole pieces are connected to the shaft at one end they present a simple cantilever and will bend in the circumferential direction when torque is applied, with a maximum deflection at the end of the pole-piece section. The pole-pieces may be connected at either end at the deflection will be maximum in the centre of the machine. As the machine axial length increases the distance between potential anchor points at end plates increases, leading to the potential for larger deflections.

The pole-pieces could be placed under compression to pre-load the stacks (to reduce deflection due to the circumferential acting torque and radial magnetic pull). However, as these loads increase the compressive forces will become excessive and may damage the insulation between lamination stacks (leading to electrical breakdown and localised hotspots, and ultimately a serious failure).

According to a first aspect of the present invention, there is provided a pole piece support comprising a frame having a spaced array of non-magnetic support structures, wherein disposed between at least a pair of adjacent non-magnetic support structures is a magnetic pole piece supported along at least a portion of its body by the adjacent non-magnetic support structures.

Preferred embodiments are described in the dependent claims.

The pole piece support is suitable for use in a magnetic drive system, magnetic gear and electrical machine. Preferably, a magnetic drive system comprising three members, a first and second of which form an input member and an output member each arranged to rotate relative to the third member, wherein two of the members have respective sets of permanent magnets, the two sets having different numbers of magnetic poles, and the other of the members comprising a pole piece support as claimed in any one of the independent or dependent claims.

Embodiments of the invention will now be described, by way of example only, and with reference to the accompanying drawings in which:

FIG. 6a is a schematic diagram of a pole piece support structure without pole pieces in place and FIG. 6b is a schematic diagram of a pole piece support structure with pole pieces in place according to the first embodiment of the present invention;

FIG. 7 is a schematic diagram of a pole piece rotor construction without pole pieces shown according to a second embodiment of the present invention.

Figure 1:
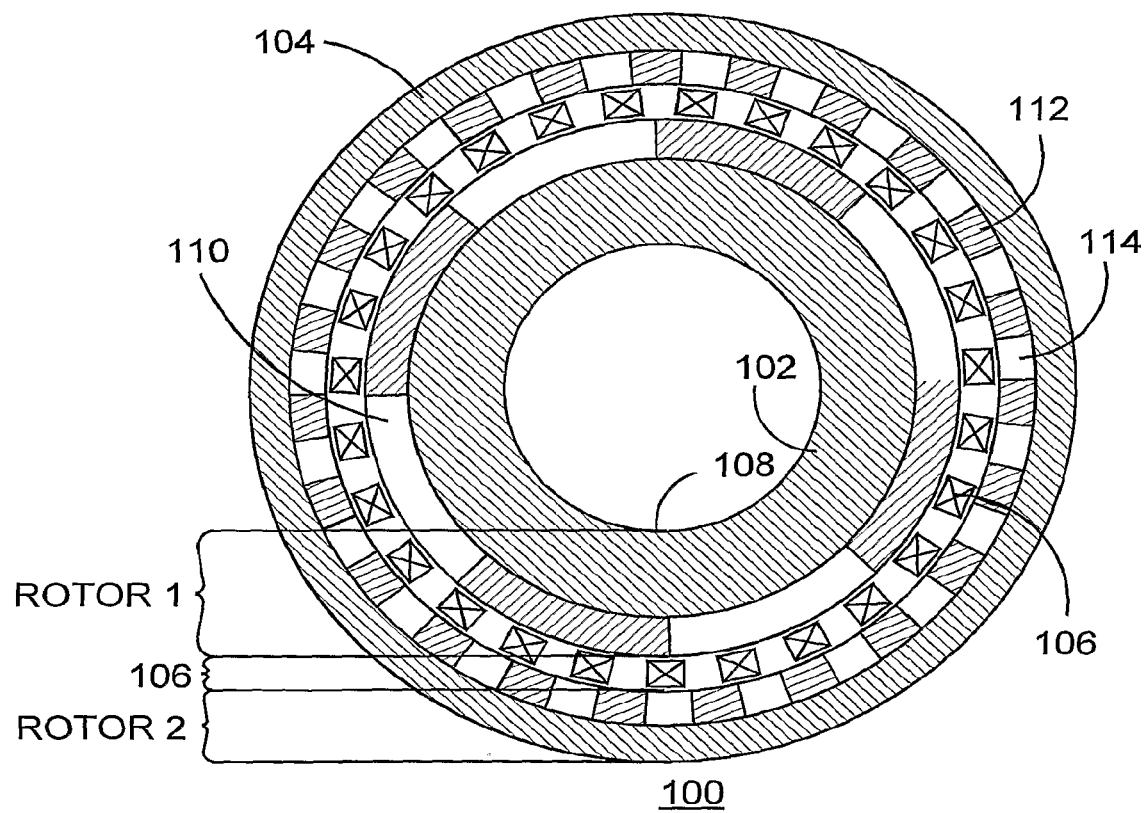
FIG. 1 is a schematic diagram of a rotary magnetic gear according to the prior art.
Figure 2:
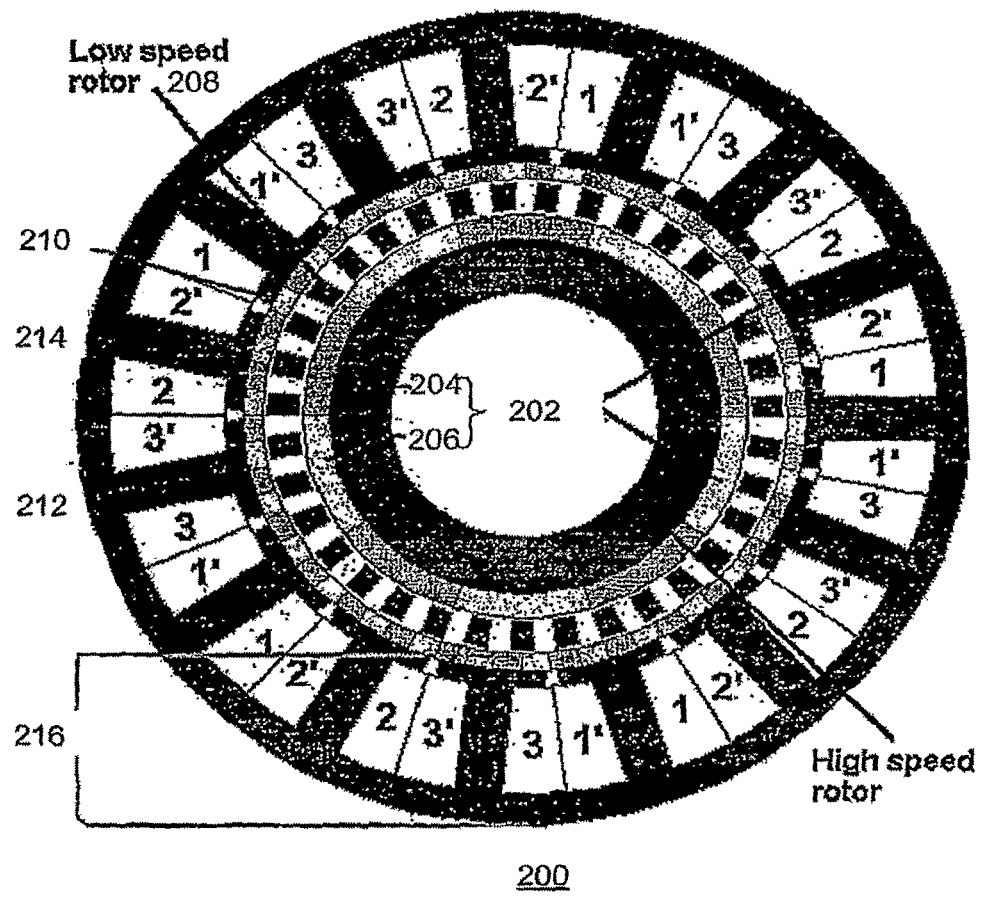
FIG. 2 is a schematic diagram of a combined electrical machine and magnetic gear according to the prior art.
Figure 3:
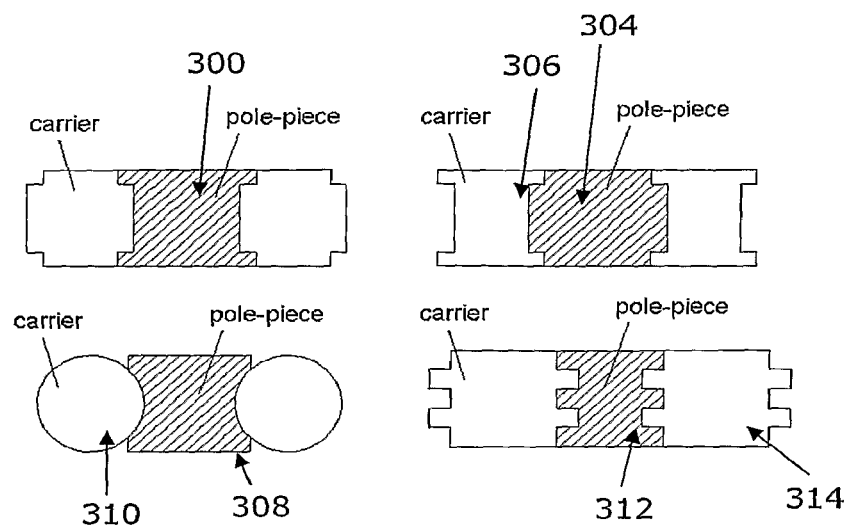
FIG. 3 is a schematic diagram of shaped pole pieces and shaped support structures according to a first embodiment of the invention.

With reference to FIG. 3, a schematic diagram of shaped pole pieces and shaped support structures according to a first embodiment of the invention comprise a first shaped pole piece 300 keyed into a first support structure 302. The first shaped pole piece 300 comprises an insert to receive an extension from the first support structure 302. Magnetic modelling can identify how much the first pole piece 300 can be shaped with recesses or extensions to key into the first support structure 302 without significantly affecting the magnetic performance of the system. The first pole piece 300 and support structure 302 have opposing male/female parts.

Further examples include a second shaped pole piece 304 keyed into a second support structure 306. The second pole piece 304 comprises a male part inserted into a female part of the second support structure 306. A third pole piece 308 comprises an insert to receive a third support structure 310 shaped as a strengthening bar. A fourth pole piece 312 comprises a series of extensions and recesses along its edge which correspondingly mate with a series of opposing extensions and recesses along the edge of a fourth support structure 314.

The support structures described in relation to FIG. 3 are non-magnetic and manufactured from a composite structure such as a carbon fibre or glass fibre. Alternatively, the support structure can be selected from a range of engineering plastics known in the art. Such an engineering plastic can be PEEK. In the particular specific description, the support structure is a carbon-fibre pultrusion.

Carbon fibre pultrusions are manufactured by drawing carbon fibres and appropriate resin through a die to offer a net shape part. The carbon fibres and/or filaments lay parallel to the length of the support structure giving significant strength. Alternatively, a cross-weave layered carbon fibre structure can be employed.

Figure 4A:
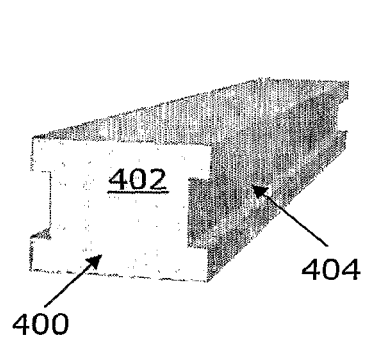
FIG. 4a is a schematic diagram of a pole piece profile and FIG. 4b is a schematic diagram of a support structure profile corresponding to the pole piece profile of FIG. 4b according to the first embodiment of the invention.
Figure 4B:
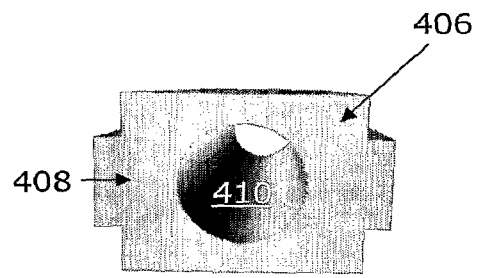

As best seen in FIG. 4a, a pole piece 400 comprises an elongate body 402 comprising an insert 404 along its length. A carbon fibre pultrusion support structure 406 comprises an extension 408 for insertion within the insert 404 of the pole piece 400. An aperture 410 is provided within the support structure 406 for receiving a strengthening bar (not shown in FIG. 4).

Figure 5A:
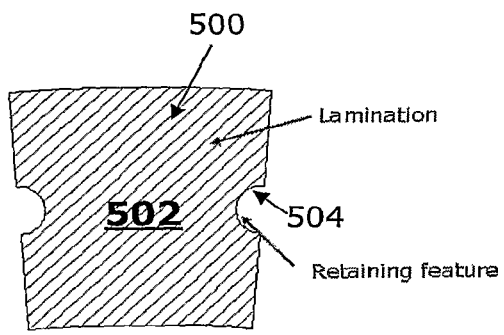
FIGS. 5a to 5c are schematic diagrams of a pole piece laminate stack shown with and without an adjacent support structure according to the first embodiment of the present invention.
Figure 5B:
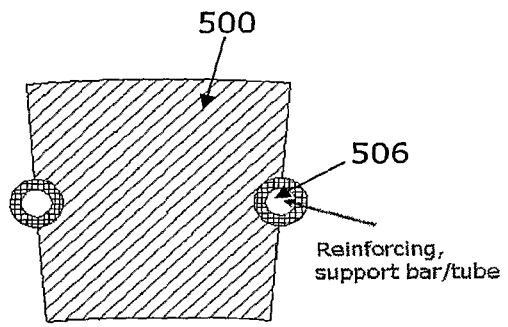
Figure 5C:
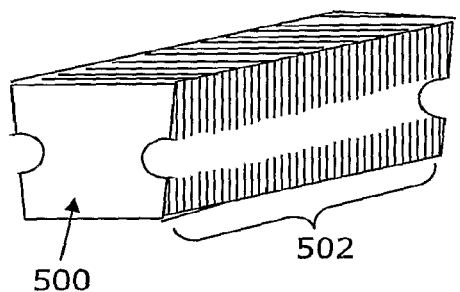

A similar arrangement to that described in FIG. 3 is described with reference to FIGS. 5a to 5c. FIG. 5a illustrates a first embodiment of the present invention where a pole piece 500 is provided with laminations 502. The laminations 502 are provided with cut-outs 504 on the outer edges of the laminations 502. This has the advantage of having negligible effect on the magnetic flux paths. As best seen in FIG. 5b, a supporting bar 506 or the like is provided along the cut-outs 504 to reinforce the laminations 502. FIG. 5c is a perspective view of a pole-piece of FIG. 5a.

In the first embodiment of the present invention, the pole piece (which as discussed above may be a laminated stack) can be bonded to the support structures using an appropriate adhesive. The adhesive can serve as a gap-filler as the surface of the laminated stack is generally not smooth. The adhesive can be a sacrificial adhesive and so not contribute significantly to the overall strength of the support structure. Alternatively, the adhesive can contribute to the load bearing strength of a pole piece support structure and so be non-sacrificial. In such an embodiment, should the adhesive fail, then the magnetic pole piece is retained by the support structure and does not drop out. In such an arrangement the adhesive is applied at the contact area of the non-magnetic support structure and an outer surface of a magnetic pole-piece. Preferably, the adhesive is present in a thickness of 0.05 mm to 0.5 mm, more preferably 0.1 mm to 0.3 mm, very preferably around 0.2 mm.

According to the first embodiment of the present invention, the support structure and pole pieces can be carried by end ring(s) to transmit a torque to an input/output shaft. The support structure can be keyed into the end ring to aid location and to transmit the torque. Generally the end ring is metallic such as steel although alternative materials such as a carbon fibre or glass fibre composites can be employed.

However, in many applications the arrangement of the support structure and pole pieces being carried by end ring(s) may be insufficient and additional location, rigidity and torque capability can be introduced by the use of a tensioned element which passes through the first set of support structures, as shown in FIG. 6a and can be anchored to the end rings. This tensioned element will typically be a carbon-fibre rod (which have excellent tensile strength) and may also be manufactured using a pultrusion process.

Therefore referring to FIG. 6a, a tensioning bar 600 is inserted within a support structure 602. Technologies are well known for terminating the support bar 600 which allows standard mechanical fixtures to be employed such as a threaded bolts or eyelets. Alternatively support bar 600 can be terminated through splicing techniques (in which the ends are splayed out or moulded over a boss feature (or looped similar to eyelet terminations in rope).

The support bar 600 can be put under significant tension without necessarily compressing the lamination stacks as the compression is borne by the support bar 600.

Pre-tensioning the support bar 600 significantly reduces bending due to the two major forces acting on them due to the main drive torque and the magnetic radial pull.

Alternatively the support bar 600 can manufactured from a metallic material such as high tensile steel. The majority (or all of these rods) must be isolated from any steel structure (e.g. steel end ring) at least one of their ends to prevent circulating currents being induced. This may be achieved using insulated collars/sleeves etc between the rods and end plate. However, by careful design a number of these rods may be connected directly to a conducting end-ring at both ends without causing circulating currents (as they enclose an even number of north and south poles and the net flux linking them is zero). Alternatively if a high strength, non-conducting end ring was employed e.g. carbon fibre ring, the circuit would not be closed.

With reference to FIG. 6b, an array of pole-pieces 604 are now rigidly mounted within the support structures 606:

1) The main drive torque acting on the pole-piece 604 also acts upon the support structures 606 between each pole-piece 604 and prevents bending of the structure circumferentially. Deflection of these are minimised by the tensioned support bars 600 through the support structures 606.
2) The support structures 606 prevent radial movement of the pole pieces 604 when provided as laminated stacks (as it has a keyed feature) and deflections are prevented due to the tensioned support bars 600.
3) Torsion of the pole-pieces 604 due to magnetic forces along their own axis is also prevented by the support structures 606.

As the torque requirements increase it may be necessary to increase the axial length of the machine rotor and hence the pole pieces. The distance between rigid anchor points for the tensioned support bars 600 and the support structures 606 and pole pieces 604 is then extended potentially allowing an increase in deflection. To overcome the increase in deflection, an intermediate support structure 700 can be provided by a ring structure. The ring structure is not necessarily fixed to a shaft (to enable the high speed rotor to be located concentrically within the pole-piece rotor. These intermediate rings could be manufactured from steel, but would then potentially have eddy currents induced in it leading to higher losses. Therefore carbon-fibre composite or glass fibre rings may be employed. This ring may have an array of holes for the tensioned support bars 600 to pass through (restricting their radial and circumferential movement) as shown in FIG. 7. The rings may also have a lip or rim to provide location for the pole pieces 604 and support structures 606. In larger machines it may be advantageous to manufacture these rings from smaller segments.

Figure 8:
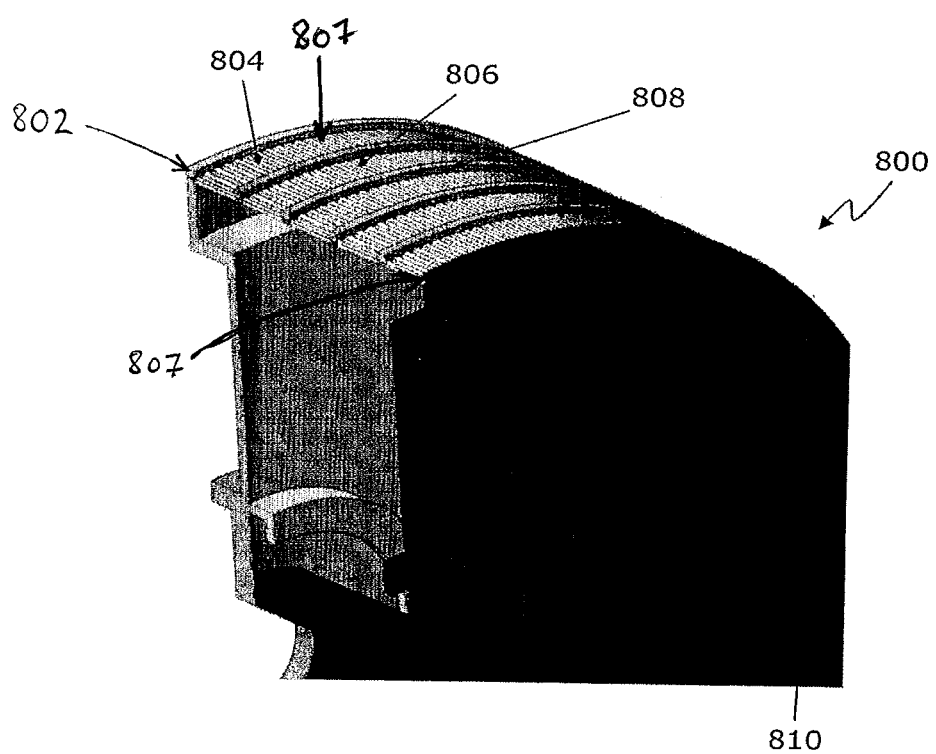
FIG. 8 is a schematic diagram of a pole piece rotor construction including pole pieces and appropriate end caps.

Referring to FIG. 8, a part section of a final assembly of a pole piece rotor 800 comprises a first end cap 802 connected to one end of a pole piece support comprising pole pieces 804, pole piece support structure 806 and intermediate support structure 808 and at another end a second end cap 810. A gap 807 may be disposed between the pole pieces 804 and the end caps 802, 810.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A pole piece support comprising a frame having a spaced array of non-magnetic support structures, wherein disposed between at least a pair of adjacent non-magnetic support structures is a magnetic pole piece supported along at least a portion of its body by the adjacent non-magnetic support structures, wherein at least one support structure comprises a stiffening bar extending through an aperture defined in the body of the support structure, wherein the stiffening bar is pre-tensioned, wherein the support structures are connected at each end to an end support and are supported intermediate their ends by an intermediate support structure that is formed as a ring structure.

2. A pole piece support as claimed in claim 1, wherein the body of the magnetic pole piece comprises a retaining feature and the retaining feature mates with a corresponding retaining feature in the body of the support structure.

3. A pole piece support as claimed in claim 2, wherein the retaining feature is a male or female part and mates with a corresponding male or female part formed in the body of the support structure.

4. A pole piece support as claimed in claim 1, wherein the support structure is accommodated within a cut-out retaining feature in the body of the pole piece.

5. A pole piece support as claimed in claim 4, wherein the support structure is a substantially cylindrical bar.

6. A pole piece support as claimed in claim 1, wherein the pole piece is accommodated within a cut-out retaining feature in the body of the support structure.

7. A pole piece support as claimed in claim 1, wherein the frame is a substantially cylindrical frame.

8. A pole piece support as claimed in claim 7, wherein the ring structure extends at least partially circumferentially around the frame.

9. A pole piece support as claimed in claim 1, wherein the ring structure comprises an array of apertures through which the support structures are retained.

10. A pole piece support as claimed in claim 1, wherein the ring structure comprises a face having a lip or a rim for locating a pole piece or a support structure.

11. A pole piece support as claimed in claim 1, wherein the support structure is formed as a pultrusion.

12. A pole piece support as claimed in claim 1, wherein the support structures comprise carbon fibre pultrusions.

13. A pole piece support as claimed in claim 12, wherein the pultrusions are shaped to key into adjacent magnetic pole pieces and each pultrusion further comprises a stiffening bar held under tension extending through the body of the pultrusion.

14. A pole piece support as claimed in claim 1, wherein a gap is provided between the magnetic pole pieces and the end support.

15. A pole piece support as claimed in claim 1, wherein an adhesive is applied at a contact area where the magnetic pole piece is supported along at least a portion of its body by the adjacent non-magnetic support structures.

16. A pole piece support as claimed in claim 15, wherein the adhesive has a thickness of 0.05 mm to 0.5 mm.

17. A magnetic drive system comprising three members, a first and second of which form an input member and an output member each arranged to rotate relative to the third member, wherein two of the members have respective sets of permanent magnets, the two sets having different numbers of magnetic poles, and the other of the members comprising a pole piece support as claimed in claim 1.

18. A magnetic drive system as claimed in claim 17, wherein the pole piece support is rotatable.

19. A magnetic drive system as claimed in claim 18, wherein a gap is provided between the magnetic pole piece and one of the other members facing the magnetic pole piece.

20. An electrical machine comprising integral magnetic gearing, the integral magnetic gearing having a pole piece support as claimed in claim 1 and two sets of permanent magnets having different numbers of magnetic poles; wherein a winding is disposed relative to the integral magnetic gearing so as to interact magnetically with the fundamental harmonic of the magnetic field of one of the sets of permanent magnets associated with the integral magnetic gearing.

21. An electrical machine as claimed in claim 20, wherein the pole piece support is rotatable.

22. A pole piece support as claimed in claim 1, wherein the pole piece support is rotatable.

23. A pole piece support as claimed in claim 1, wherein the aperture is located in the center of the body of the support structure in both circumferential and radial directions.

* * * * *